(12) United States Patent
Fujimoto et al.

(10) Patent No.: US 8,350,903 B2
(45) Date of Patent: Jan. 8, 2013

(54) VEHICLE-MOUNTED IMAGE PROCESSING DEVICE, AND METHOD FOR CONTROLLING VEHICLE-MOUNTED IMAGE PROCESSING DEVICE

(75) Inventors: Akira Fujimoto, Komaki (JP); Yukihiro Matsuura, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 965 days.

(21) Appl. No.: 12/442,076

(22) PCT Filed: Nov. 9, 2007

(86) PCT No.: PCT/JP2007/071837
§ 371 (c)(1),
(2), (4) Date: Mar. 19, 2009

(87) PCT Pub. No.: WO2008/056789
PCT Pub. Date: May 15, 2008

(65) Prior Publication Data
US 2009/0251534 A1    Oct. 8, 2009

(30) Foreign Application Priority Data
Nov. 9, 2006   (JP) .................................. 2006-304604

(51) Int. Cl.
*G06K 9/34*   (2006.01)
(52) U.S. Cl. .............................. 348/78; 348/77; 348/371
(58) Field of Classification Search ............... 348/78, 348/77, 370, 371; 382/190
See application file for complete search history.

(56) References Cited

U.S. PATENT DOCUMENTS

| 6,088,470 | A  | * | 7/2000  | Camus et al. ................. 382/117 |
| 6,634,749 | B1 |   | 10/2003 | Morrison et al. |
| 6,952,498 | B2 |   | 10/2005 | Ishikura |
| 7,646,422 | B2 | * | 1/2010  | Kisacanin et al. ............. 348/370 |
| 7,777,778 | B2 | * | 8/2010  | Scharenbroch et al. ........ 348/78 |
| 2002/0181774 | A1 |   | 12/2002 | Ishikura |
| 2004/0005083 | A1 |   | 1/2004  | Fujimura et al. |
| 2004/0170304 | A1 |   | 9/2004  | Haven et al. |
| 2006/0087582 | A1 | * | 4/2006  | Scharenbroch et al. ...... 348/370 |

(Continued)

FOREIGN PATENT DOCUMENTS
DE       38 03 916  A1    8/1989
(Continued)

OTHER PUBLICATIONS
Japanese Office Action dated Apr. 14, 2009.
(Continued)

*Primary Examiner* — Kenneth R Coulter
(74) *Attorney, Agent, or Firm* — Sughrue Mion, PLLC

(57) ABSTRACT

Light reflected by glasses etc. worn by a driver picked up in a facial image of the driver is reduced. With a vehicle-mounted camera (1) equipped with a first LED illuminating device (12) and a second LED illuminating device (13), each illuminating device is lit up alternately in synchronism with times of photographing facial images and facial images of the driver are taken at each lighting time. The vehicle-mounted camera then compares brightness for each pixel positioned at the same relative positions on each photographed facial image and extracts pixels of low brightness. The vehicle-mounted camera then generates new facial images for transmission to an ECU by synthesizing each of the extracted pixels. The ECU on the receiving side then detects inattentive driving etc. by the driver based on the facial images.

6 Claims, 12 Drawing Sheets

U.S. PATENT DOCUMENTS

2008/0084499 A1* 4/2008 Kisacanin et al. ............ 348/370
2009/0190827 A1* 7/2009 Saito ............................ 382/154

FOREIGN PATENT DOCUMENTS

| JP | 6-323832 A | 11/1994 |
|---|---|---|
| JP | 08-185503 A | 7/1996 |
| JP | 2002-352229 A | 12/2002 |
| JP | 2004-070512 A | 3/2004 |

OTHER PUBLICATIONS

Extended European Search Report issued in European Application No. 07831568.6 dated Jan. 31, 2011.

Ji Q et al: "Real-Time Eye, Gaze, and Face Pose Tracking for Monitoring Driver Vigilance", Real-Time Imaging, Academic Press Limited, GB, vol. 8, No. 5, Oct. 1, 2001, pp. 357-377.

* cited by examiner

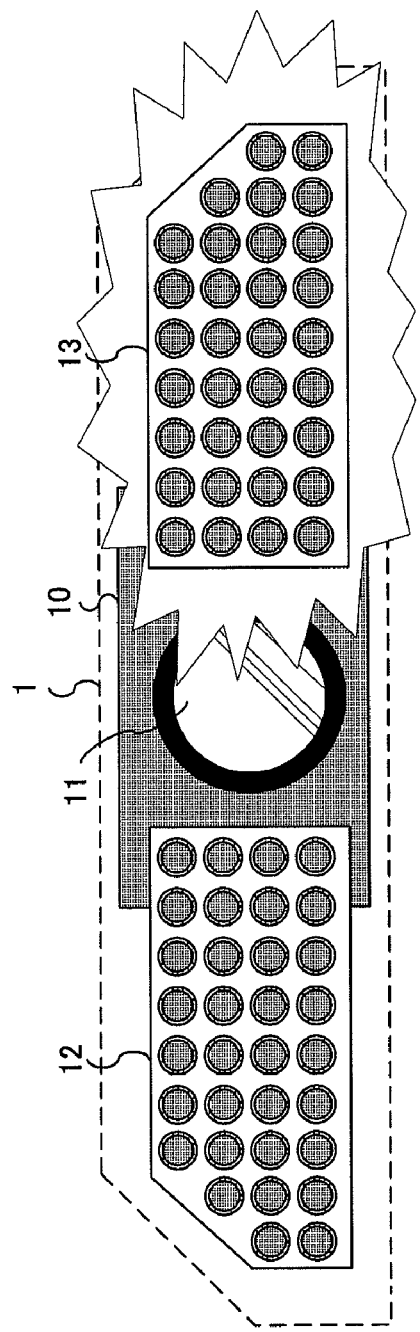
FIG. 5A
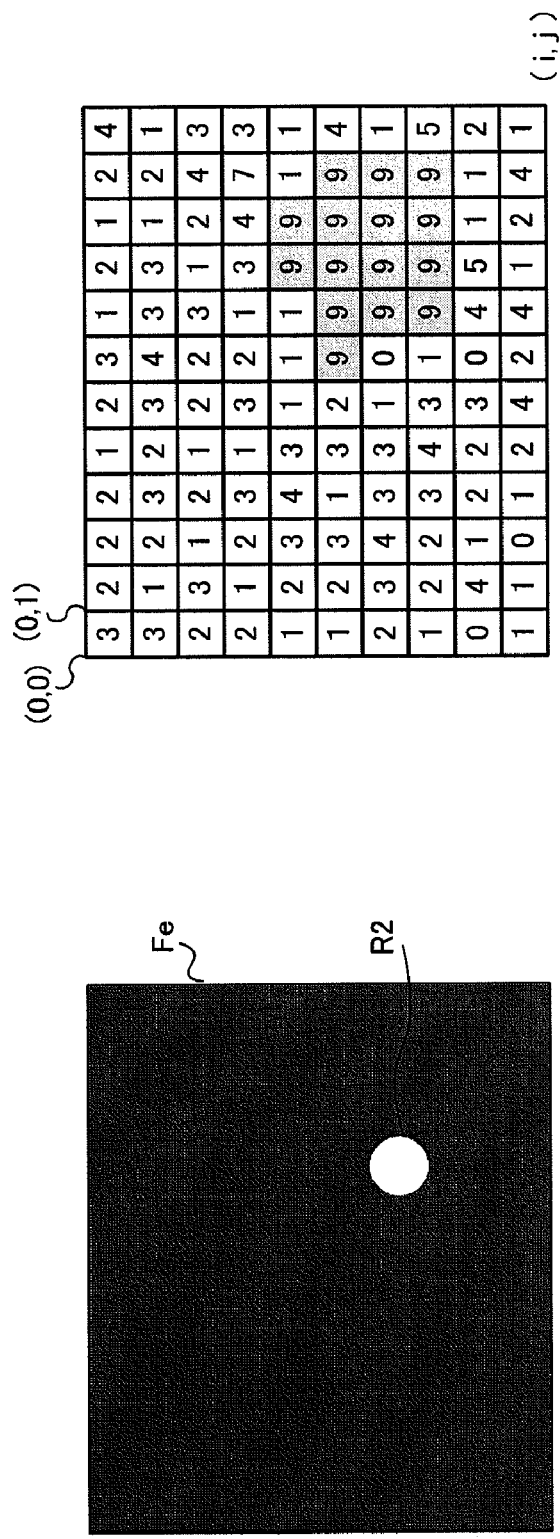
FIG. 5B
FIG. 5C

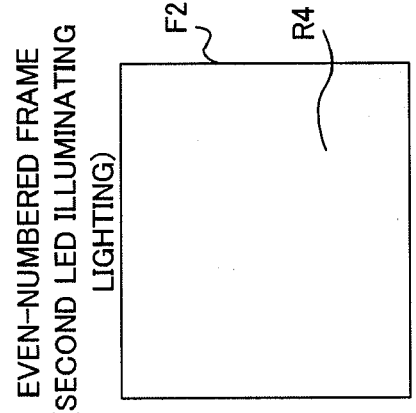
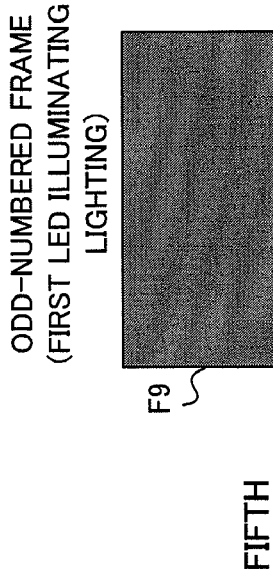
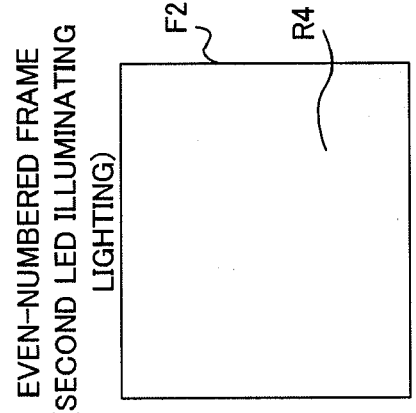

VEHICLE-MOUNTED IMAGE PROCESSING DEVICE, AND METHOD FOR CONTROLLING VEHICLE-MOUNTED IMAGE PROCESSING DEVICE

TECHNICAL FIELD

The present invention relates to a vehicle-mounted image processing device and a method for controlling a vehicle-mounted image processing device that photographs facial images of a vehicle driver.

BACKGROUND ART

Image processing devices that extract images of the eyes from a facial image of a driver taken by a vehicle-mounted camera and then perform various processing based on the image of the eyes (for example, processing for discerning which direction the driver is looking in) are widely utilized.

Patent Document 1: Unexamined Japanese Patent Application KOKAI Publication No. 2002-352229

Patent Document 2: Unexamined Japanese Patent Application KOKAI Publication No. 2004-070512

DISCLOSURE OF INVENTION

Problems to be Solved by the Invention

For example, Patent Document 1 discloses a detection device that determines light reflected by glasses etc. picked up in a facial image of a driver illuminated from different directions and removes the picked up reflected light from the facial image. This detection device discerns differences between relative positions of a bright region positioned in the vicinity of the eyes on a facial image of the driver illuminated from a prescribed direction and a bright region positioned in the vicinity of the eyes on the facial image of the driver illuminated from a different direction to the first direction as light reflected due to glasses etc.

However, when the picked up reflected light for the facial image of the driver illuminated from a prescribed direction is picked up at the same relative positions as the picked up light reflected by the facial image of the driver illuminated from a different direction, this detection device cannot discern the picked up light as being reflected light.

In addition, for example, Patent Document 2 discloses a facial state detection device that determines a direction toward which a driver is facing based on the facial image of the driver. This facial state detection device takes facial images consecutively at prescribed intervals. The facial state detection device then obtains the difference between the brightness of each pixel for the facial image photographed on this occasion and the brightness of each pixel for the corresponding facial image taken on the previous occasion. The direction toward which the face of the driver is facing is then discerned based on a change in barycentric coordinates of a region consists of pixels of which this difference is a prescribed value or more.

The position at which light reflected by glasses etc. is reflected to the facial image then changes moment by moment as the vehicle travels. Therefore, there are also cases where regions occur where the difference between the brightness of each pixel of the facial image taken on this occasion and the brightness of each pixel of the corresponding facial image taken on the previous occasion is large even when the orientation of the driver's face does not change. When the barycentric coordinates of a region consists of pixels where the difference in brightness is a prescribed value or more change by the occurrence of this region, there is the possibility that this facial state detection device will discern that the driver is facing to a direction different from the actual orientation of the face of the driver.

In order to resolve the above situation, it is an object of the present invention to reduce the influence of light reflected by glasses etc. worn by the driver picked up in a facial image.

Means for Resolving the Problems

In order to resolve the problems described above, a vehicle-mounted image processing device of a first aspect of the present invention comprises a plurality of illuminating units that illuminate a subject, a lighting unit that lights up the plurality of illuminating units at different times, a photographing unit that photographs respective images showing a subject illuminated by each illuminating unit lit up at each of the times by the lighting unit, and a synthesizing unit that generates and outputs a new image showing the subject by extracting portions, of portions positioned at the same relative positions, based on the brightness for the portions of each image positioned at the same relative positions on each image indicating the subject photographed by the photographing unit and synthesizing the extracted portions.

For example, it is possible for the lighting unit to sequentially light up each of the illuminating units, it is possible for the photographing unit to photograph the respective images showing the subject at each of the times when each illuminating unit is lit by the lighting unit, and it is possible for the synthesizing unit to extract images, of the lowest brightness, of portions positioned at the same respective relative positions on each image showing the subject photographed by the photographing unit and generate a new image showing the subject by synthesizing the extracted portions.

For example, two of the illuminating units can be provided, the lighting unit can alternately light up each illuminating unit, the photographing unit can photograph respective images showing the subject at each time when each illuminating unit is lit by the lighting unit, and the synthesizing unit can extract portions of the lowest brightness from portions positioned at the same respective relative positions on each odd-numbered photographed subject image and each even-numbered photographed subject image taken by the photographing unit and can generate a new image showing the subject by synthesizing the extracted portions.

For example, the synthesizing unit can compare the brightness of pixels positioned at the same relative positions on each image showing the subject, extract pixels of the lowest brightness, and synthesize each extracted pixel.

For example, the synthesizing unit can divide each image showing the subject taken by the photographing unit into a plurality of blocks, compare the brightness of each block positioned at the same relative position on each image, extract blocks of the lowest brightness, and synthesize the extracted blocks.

For example, the photographing unit can further comprise an exposure control unit that obtains average brightness for each image showing the subject taken by the photographing unit and controls exposure time of the photographing unit when photographing images so that an absolute value of a difference between each average brightness obtained becomes a prescribed value or less.

For example, the vehicle-mounted image processing device can also comprise a control unit that carries out prescribed control based on an image of an eye included in a new image synthesized by the synthesizing unit.

In order to achieve the aforementioned object, a vehicle-mounted image processing device of a second aspect of the present invention comprises a lighting step of lighting up a plurality of illuminating units at different times, a photographing step of photographing respective images showing a subject illuminated by each illuminating unit lit up at each time in the lighting step, and a synthesizing step of generating and outputting a new image showing the subject by extracting portions, of portions positioned at relative positions, based on brightness for the portions positioned at the same relative positions on each image showing the subject photographed in the photographing step and synthesizing the extracted portions.

Effect of the Invention

According to the present invention, it is possible to reduce the influence of light reflected by glasses etc. worn by a driver being picked up in facial images.

BRIEF DESCRIPTION OF THE DRAWINGS

FIG. 5A is a diagram showing a situation when a second LED illuminating device is lit; FIG. 5B is a diagram showing an example of an even-numbered frame photographed by the camera when the second LED illuminating device is lit; FIG. 5C is a diagram showing the brightness of each pixel positioned on an even-numbered frame;

FIG. 9A is a diagram showing an example of an odd-numbered frame photographed prior to execution of the first exposure control process of the first time; FIG. 9B is a diagram showing an example of an even-numbered frame photographed prior to execution of the first exposure control process of the first time; FIG. 9C is a diagram showing an example of a facial image after picking up of the reflected light is alleviated based on an odd-numbered frame and an even-numbered frame photographed prior to execution of the first exposure control process of the first time; FIG. 9D is a diagram showing an example of an odd-numbered frame photographed prior to execution of the first exposure control process of the fifth time; FIG. 9E is a diagram showing an example of an even-numbered frame photographed prior to execution of the first exposure control process of the fifth time; FIG. 9F is a diagram showing an example of a facial image after reflection of the reflected light is alleviated based on the odd-numbered frames and the even-numbered frames photographed prior to execution of the first exposure control process of the fifth time;

Figure 1:
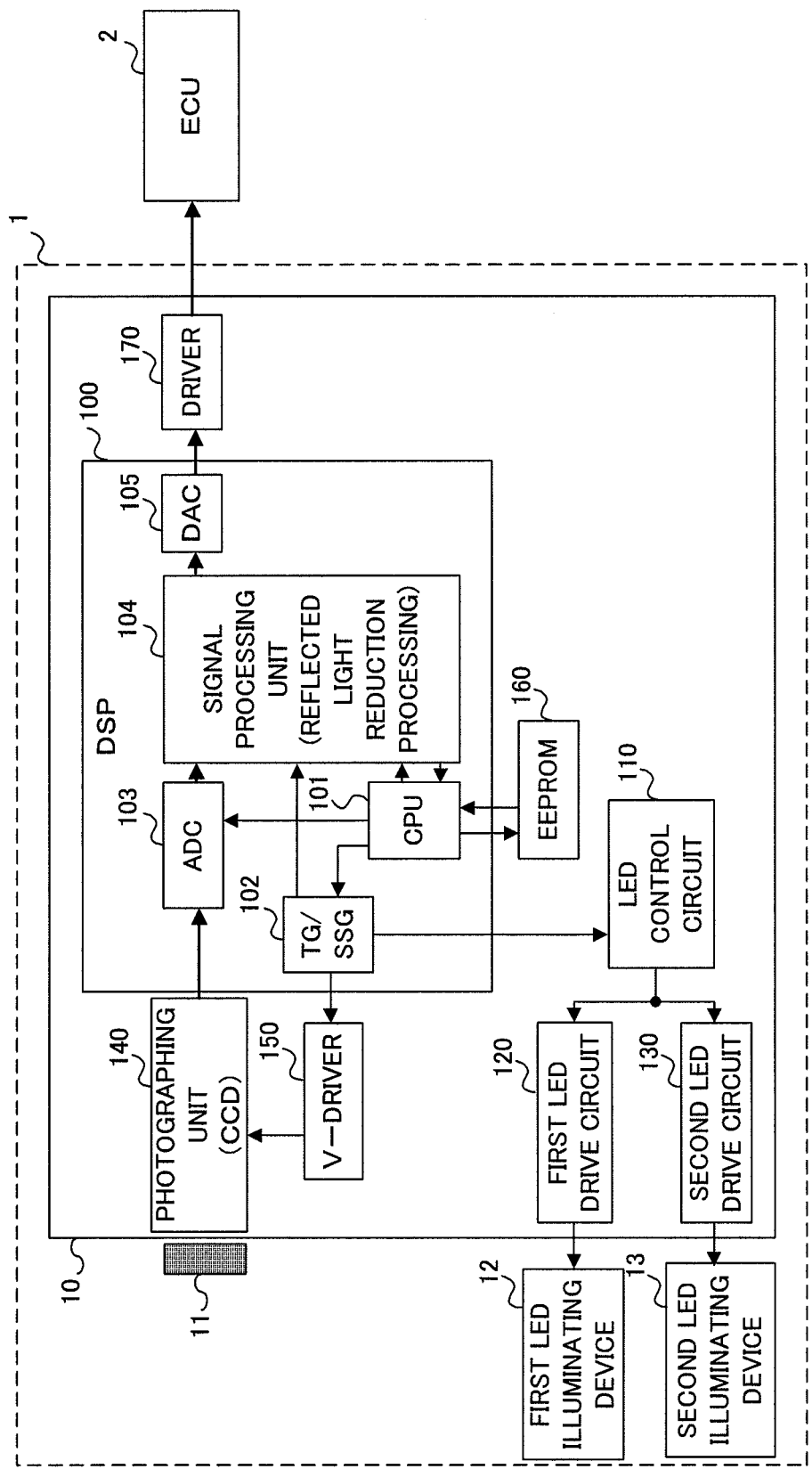
FIG. 1 is a diagram showing an overall configuration of a vehicle-mounted camera system and a circuit configuration of a camera constituting the vehicle-mounted camera system of a first embodiment of the present invention.

EXPLANATION OF REFERENCE NUMERALS vehicle-mounted camera 1
camera 10
optical filter 11
first LED illuminating device (illuminating unit) 12
second LED illuminating device (illuminating unit) 13
DSP 100
CPU (exposure control unit) 101
TG/SSG 102
ADC 103
signal processing unit (synthesizing unit) 104
DAC 105
LED control circuit (lighting unit) 110
first LED drive circuit 120
second LED drive circuit 130
photographing unit 140
V-driver 150
EEPROM 160
driver 170
ECU 2
signal processing unit 21
control unit 22

BEST MODE FOR CARRYING OUT THE INVENTION

First Embodiment

The following is an explanation of a vehicle-mounted image processing device of a first embodiment of the present invention. As shown in FIG. 1, a vehicle-mounted camera system (including a vehicle-mounted image processing device, and a method for controlling a vehicle-mounted image processing device) of the first embodiment includes a vehicle-mounted camera 1 and an ECU (Engine Control Unit) 2.

The ECU 2 is an electronic control device that controls the operation of the entire vehicle. The ECU 2 receives facial images that are images showing the face of the driver from the vehicle-mounted camera 1 and detects inattentive driving by the driver based on the facial images.

The vehicle-mounted camera 1 includes a camera 10, an optical filter 11, a first LED (Light-Emitting Diode) illuminating device 12, and a second LED illuminating device 13.

Figure 2:
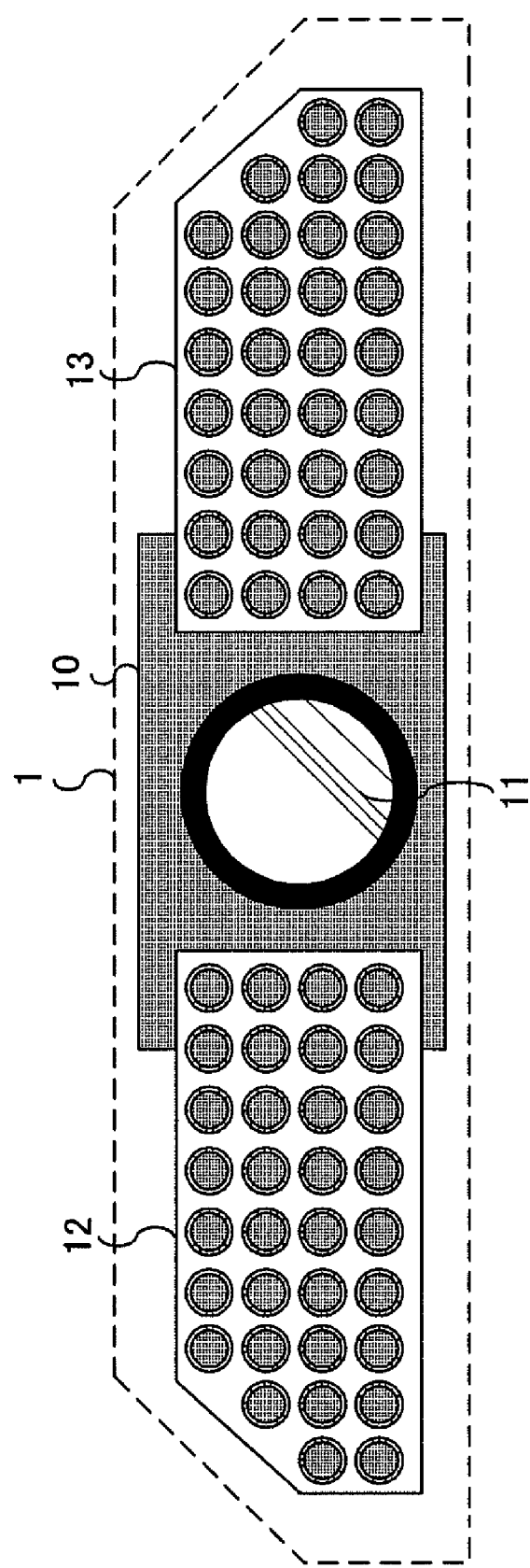
FIG. 2 is a diagram showing the appearance of the vehicle-mounted camera of the first embodiment as viewed from the front.
Figure 3:
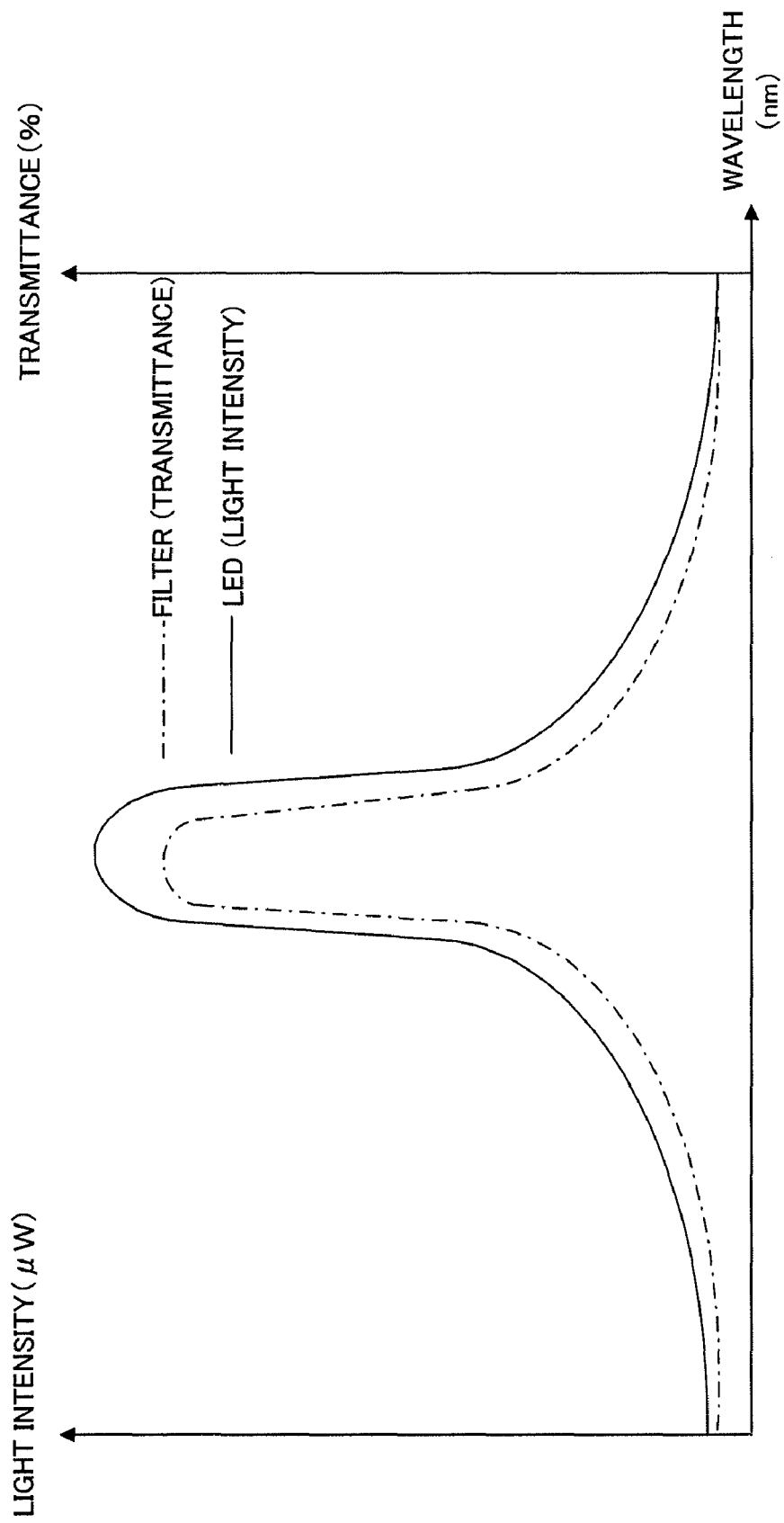
FIG. 3 is a diagram showing transmittance characteristics of an optical filter of the vehicle-mounted camera, and optical intensity of LEDs of each illuminating device.

The optical filter 11 is an optical band-pass filter that is provided at the front surface of the camera 10 as shown in FIG. 2. The optical filter 11 is constructed from an optical filter with a large transmittance (%) with respect to light (for example, near infrared light) having a prescribed wavelength as shown in FIG. 3. This reduces the amount of light reflected by glasses etc. worn by the driver incident to the camera 10.

As shown in FIG. 2, the first LED illuminating device 12 and the second LED illuminating device 13 respectively have a plurality of LEDs for illuminating the face of the driver. The first LED illuminating device 12 is disposed to the left side of the camera 10 when viewed from the front of the vehicle-mounted camera 1. The second LED illuminating device 13 is disposed to the right side of the camera 10.

As shown in FIG. 3, it is preferable for the LEDs of each of the illuminating devices 12 and 13 to have characteristic which the wavelength region for which the light intensity (μW) when light is generated is a maximum to substantially coincide with the wavelength region for which the transmittance (%) of the optical filter 11 is a maximum.

Next, an explanation is given of a circuit configuration of the camera 10. As shown in FIG. 1, the camera 10 includes a DSP (Digital Signal Processor) 100, an LED control circuit 110, a first LED drive circuit 120, a second LED drive circuit 130, a photographing unit 140, a V-driver 150, an EEPROM 160, and a driver 170.

The LED control circuit 110 controls the illumination of each of the illuminating devices 12 and 13 in accordance with the illumination timing for the first LED illuminating device 12 and the second LED illuminating device 13 notified by the DSP 100. In order to implement this control, the LED control circuit 110 sends a lighting signal instructing the illumination of each of the illuminating devices 12 and 13 to the first LED drive circuit 120 and the second LED drive circuit 130.

The first LED drive circuit 120 and the second LED drive circuit 130 then supply LED drive current to the first LED illuminating device 12 and the second LED illuminating device 13 so as to light the LEDs of each of the illuminating devices 12 and 13 in response to the lighting signal sent from the LED control circuit 110.

The photographing unit 140 includes CCD (Charge-Coupled Devices), takes facial images of the driver, and sends the facial images to the DSP 100. For example, the transmission method is a non-interlaced method with 30 pictures being taken per second (i.e. a frame period in which the photographing unit 140 takes a picture of one frame is 1/30 seconds). The resolution of the facial image after A/D (Analog to Digital) conversion by the DSP 100 is taken to be 240 vertical pixels by 320 horizontal pixels.

The V (Video)-driver 150 is a control interface that controls the operation of the photographing unit 140 in accordance with an exposure time for the photographing unit 140 and photographing timing for the facial images notified by the DSP 100.

The EEPROM 160 stores a control program etc. for the camera 10 and functions as a work area for the DSP 100.

The driver 170 is a communication interface for performing communication with the ECU 2. The driver 170 receives facial images after image processing by the DSP 100 from the DSP 100 and sends the facial images to the ECU 2.

The DSP 100 is a processing device that mainly subject images acquired by the photographing unit 140 to prescribed image processing. The DSP 100 includes a CPU 101, a TG (Timing Generator)/SSG (Sync Signal Generator) 102, an ADC (Analog/Digital Converter) 103, a signal processing unit 104, and a DAC (Digital/Analog Converter) 105.

The CPU 101 includes a microprocessor unit etc. and reads and executes a control program of the camera 10 from the EEPROM 160.

The TG/SSG 102 notifies the V-driver 150 of the photographing timing of the photographing unit 140 under the control of the CPU 101. The TG/SSG 102 also alternately notifies the LED control circuit 110 of the timing of the lighting up of the first LED illuminating device 12 and the timing of the lighting up of the second LED illuminating device 13. The TG/SSG 102 also gives notification of each timing in such a manner as to synchronize the timing of the lighting up of each illuminating device 12 or 13 and the timing of photographing by the photographing unit 140.

The ADC 103 converts the facial images received from the photographing unit 140 from an analog format to a digital format and sends the facial images after A/D conversion to the signal processing unit 104.

The signal processing unit 104 then subjects the facial images received from the ADC 103 to processing to alleviate the influence of light reflected by glasses and sends the processed facial images to the DAC 105. The details of the processing for alleviating the influence of the reflected light are described in the following.

The DAC 105 converts facial images received from the signal processing unit 104 from a digital format to an analog format for transmission to the driver 170.

Next, a description is given of the operation of the vehicle-mounted camera 1 having the above configuration. The user performs an operation so as to designate the start of operation of the vehicle-mounted camera 1, and the CPU 101 reads out the control program from the EEPROM 160 and starts control of the camera 10.

After the start of control, the CPU 101 sends a drive signal for driving the TG/SSG 102 to the TG/SSG 102. The TG/SSG 102 then responds to this drive signal and starts operation.

After starting operation, the TG/SSG 102 repeatedly gives notification to the LED control circuit 110 of the lighting timing for alternately lighting up the first LED illuminating device 12 and the second LED illuminating device 13. Notification of the lighting timing is executed, for example, at 1/30-second intervals.

The LED control circuit 110 sends the lighting signal instructing lighting of the first LED illuminating device 12 or the second LED illuminating device 13 to the first LED drive circuit 120 or the second LED drive circuit 130 in accordance with each notified lighting timing. Each of the drive circuits 120 and 130 alternately lights up each illuminating device 12 and 13 in response to this lighting signal.

The TG/SSG 102 then repeatedly notifies the V-driver 150 of the timing of photographing of the facial images at the photographing unit 140. The TG/SSG 102 then synchronizes the photographing timing with the timing of the lighting the first LED illuminating device 12 and the timing of lighting the second LED illuminating device 13. For example, when each of the illuminating devices 12 and 13 is alternately lit at 1/30-second intervals, the TG/SSG 102 gives notification of the synchronized photographing timing every 1/30 seconds. The V-driver 150 photographs the face of the driver at the photographing unit 140 at each notified photographing timing.

The photographing unit 140 then sends photographed facial images (analog format) to the ADC 103. The ADC 103 then A/D converts the facial images and sends the facial images to the signal processing unit 104.

The signal processing unit 104 consecutively receives facial images from the ADC 103 and stores "odd-numbered frames" that are facial images received by the odd number of times and "even-numbered frames" that are facial images received by even number of times in internal memory (not shown). The signal processing unit 104 then reads out the odd-numbered frames and even-numbered frames photographed immediately before from the internal memory and obtains brightness of the pixels included in each frame.

The signal processing unit 104 then compares the brightness of each pixel positioned at the same relative positions on both frames and extracts pixels where the respective brightness are low at each relative position. The signal processing unit 104 then generates one new facial image indicating the face of the driver synthesized from each of the extracted pixels and sends this facial image to the DAC 105. The signal processing unit 104 then executes this processing each prescribed time. For example, when the odd-numbered frames or the even-numbered frames are received from the ADC 103 every 1/30 seconds, the signal processing unit 104 generates a new facial image every 1/15 seconds for transmission to the DAC 105.

After D/A (Digital to Analog) converting the received facial images, the DAC 105 supplies the received facial images to the driver 170. The driver 170 then sends the facial images supplied by the DAC 105 to the ECU 2.

The ECU 2 then carries out various control processing based on the facial images newly generated by the signal processing unit 104. "Various control processing" refers to, for example, processing for detecting and warning against inattentive driving by the driver by determining the direction of the driver's line of sight, or processing corresponding to the determination results when the direction in which the driver is looking is determined, etc.

The method for determining that the driver is driving inattentively is arbitrary. For example, the ECU 2 can specify the direction of the line of sight based on pixels positioned at regions of the facial image indicating the driver's eyes. It is also possible to determine that the driver is driving inattentively when there is a difference between the direction of the line of sight and the direction towards the front of the vehicle of a prescribed value or more.

Next, an explanation is given of an example of a facial image newly created as a result of synthesis of pixels of low brightness respectively extracted from the same relative positions of the odd-numbered frames and the even-numbered frames. When the resolution is 240 vertical pixels by 320 horizontal pixels, the signal processing unit 104 processes 76,800 pixels per frame. However, in the example shown in the following in FIGS. 4 to 6, the resolution for one frame is simplified to 10 vertical pixels by 12 horizontal pixels (120 pixels) for ease of understanding.

Figures 4A, 4B, 4C:
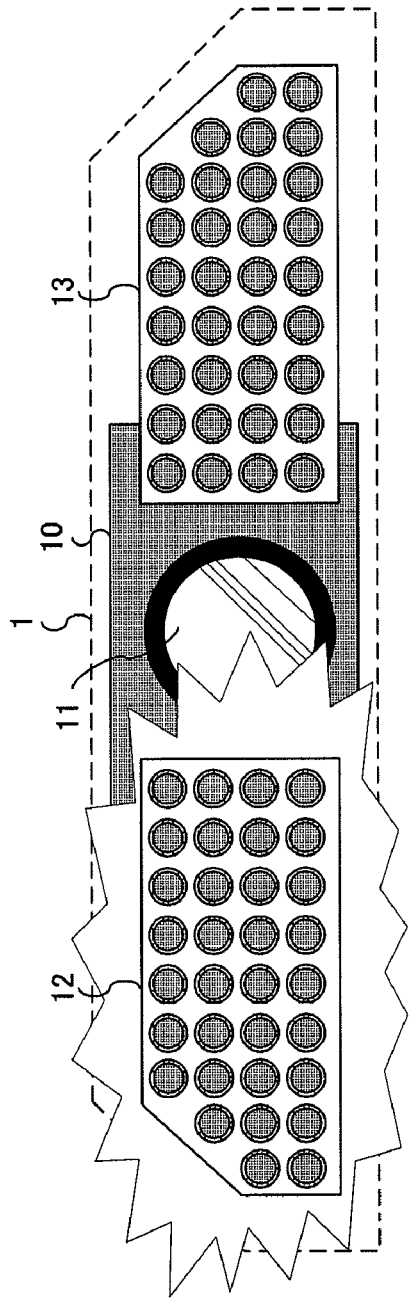
FIG. 4A is a diagram showing a situation when a first LED illuminating device is lit.
FIG. 4B is a diagram showing an example of an odd-numbered frame photographed by a camera when the first LED illuminating device is lit.
FIG. 4C is a diagram showing the brightness of each pixel positioned on an odd-numbered frame.

As shown in FIG. 4A, the camera 10 photographs a subject at a time when the first LED illuminating device 12 is lit by the first LED drive circuit 120. FIG. 4B is one example of an image for an odd-numbered frame Fo photographed by the photographing unit 140 of the camera 10, where R1 in the odd-numbered frame Fo is the pickup of light reflected by glasses etc. of a driver. The signal processing unit 104 then classifies the brightness of each of the pixels of the odd-numbered frame Fo into ten stages of, for example, 0 to 9, as shown in FIG. 4C.

As shown in FIG. 5A, the camera 10 photographs a subject at a time when the second LED illuminating device 13 is lit by the second LED drive circuit 130. FIG. 5B is one example of an image for an even-numbered frame Fe photographed by the photographing unit 140 of the camera 10, where R2 is an even-numbered frame Fe is the pickup of light reflected by glasses etc. of the driver. The signal processing unit 104 then classifies the brightness of each of the pixels of the even-numbered frame Fe into ten stages of, for example, 0 to 9, as shown in FIG. 5C.

The signal processing unit 104 compares the brightness of each pixel positioned at the same relative positions on the odd-numbered frame Fo and the even-numbered frame Fe and extracts pixels where the brightness for each relative position is low.

In the examples in FIG. 4C and FIG. 5C, when the relative positions are both at coordinates (0, 0), the brightness of the pixels for the odd-numbered frame Fo shown in FIG. 4C is 4 and the brightness of the pixels for the even-numbered frame Fe shown in FIG. 5C is 3. In this event, the signal processing unit 104 extracts pixels positioned at the coordinate (0, 0) of the even-numbered frame Fe for which the brightness is low. Further, when the relative positions are both coordinate (0, 1), the brightness of the pixels at the odd-numbered frame Fo of FIG. 4C is 1, and the brightness of the pixels at the even-numbered frame Fe of FIG. 5C is 2. In this event, the signal processing unit 104 extracts pixels positioned at the coordinate (0, 1) of the odd-numbered frame Fo for which the brightness is low.

The signal processing unit 104 compares brightness and extracts pixels for all of the coordinates of the odd-numbered frame Fo and the even-numbered frame Fe and generates one new facial image by an appropriately arraying of each of the extracted pixels. The signal processing unit 104 generates a facial image f0 shown in FIG. 6A for the example of the odd-numbered frame Fo shown in FIG. 4B and the even-numbered frame Fe shown in FIG. 5B.

Figures 6A, 6B:
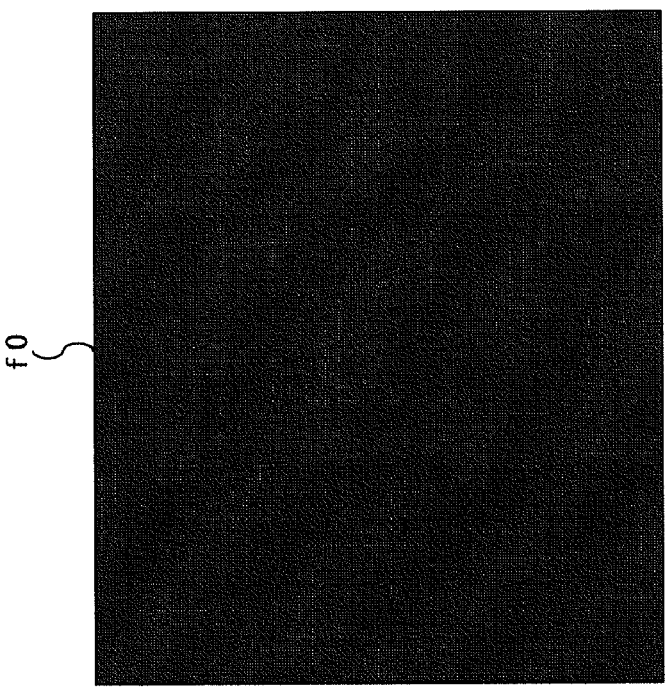
FIG. 6A is a diagram showing an example of a new facial image created by a signal processing unit.
FIG. 6B is a diagram showing the brightness of each pixel positioned on the new facial image created by the signal processing unit.

When the brightness of the pixels constituting this facial image f0 is expressed in ten stages of 0 to 9, as shown in FIG. 6B, the brightness of pixels positioned at the coordinate (0, 0) of the image f0 becomes the brightness (=3) occurring at the coordinate (0, 0) of the even-numbered frame Fe of FIG. 5C. Further, the brightness of pixels positioned at the coordinate (0, 1) of the image f0 shown in FIG. 6B becomes the brightness (=1) occurring at the coordinate (0, 1) of the odd-numbered frame Fo of FIG. 4C.

In the above description, the vehicle-mounted camera 1 alternately lights the first LED illuminating device 12 and the second LED illuminating device 13 and the face of the driver is photographed at the photographing unit 140 in synchronism with the timing of the lighting of each of the illuminating devices. The signal processing unit 104 then compares the brightness of each pixel positioned at the same respective relative positions on the odd-numbered frame and the even-numbered frame photographed by the photographing unit 140 and extracts pixels of low brightness positioned at each relative position. The signal processing unit 104 then synthesizes each extracted pixel and generates a new facial image.

The picking up of reflected light of a high degree of brightness can therefore be reduced as shown in the example of a facial image f0 in FIG. 6A for the facial image newly created by the signal processing unit 104. As a result, ECU 2 is able to detect inattentive driving by the driver in a more accurate manner based on facial images after the reduction of the reflected light.

Second Embodiment

There is, however, a certain amount of variation in quality with mass-produced LEDs. There is therefore the possibility that the amount of light emitted by the first LED illuminating device 12 when photographing odd-numbered frames and the amount of light emitted by the second LED illuminating device 13 when photographing even-numbered frames will be different.

When there is a substantial difference in the amount of light emitted by an illuminating device when photographing each frame, for example, regions of low brightness occur even when light reflected by glasses is picked up at odd-numbered frames, so that bright regions will occur at even-numbered frames even when light reflected by the glasses is not picked up. In this case, the signal processing unit 104 extracts pixels of a low brightness positioned at regions where the reflected light is picked up in processing synthesizing a new facial image shown in the first embodiment. This then impedes each control process executed based on the facial image after synthesis.

In order to avoid this problem, it is necessary to control exposure time so that odd-numbered frames photographed at the time of lighting of the first LED illuminating device 12 and even-numbered frames photographed at the time of lighting of the second LED illuminating device 13 have substantially the same brightness. This kind of exposure control processing is referred to as "first exposure control processing" in the following.

The overall structure of the vehicle-mounted camera system of the second embodiment that is an example of carrying out first exposure control processing is basically the same as the example shown in FIG. 1. However, a first exposure control program for first exposure control processing and various setting values are also stored in the EEPROM 160 the vehicle-mounted camera 1 of the second embodiment is provided with.

The EEPROM 160 stores a brightness difference maximum value BDmax, a brightness difference minimum value BDmin, a maximum exposure value ETmax, and a minimum exposure value ETmin as setting values.

The brightness difference maximum value BDmax and the brightness difference minimum value BDmin indicate an maximum and a minimum of the permitted range for reducing the influence of reflected light on the facial image using synthesis processing by the signal processing unit 104 even when the brightness (average value) of odd-numbered frames and the brightness (average value) of even-numbered frames are different.

Further, the maximum exposure value ETmax and minimum exposure value ETmin indicate a maximum value and a minimum value for exposure time for which exposure of a facial image by the photographing unit 140 is appropriate. When the exposure time is the maximum exposure value ETmax or more, the facial image is overexposed. When the exposure time is less than the minimum exposure value ETmin, the facial image is underexposed. The facial image is exposed in an appropriate manner if the exposure time is less than the maximum exposure value ETmax and larger than the minimum exposure value ETmin.

Next, a detailed description is given of "first exposure control processing" by the vehicle-mounted camera 1 having the above configuration. The CPU 101 reads out a first exposure control program from the EEPROM 160 and executes the first exposure control program, for example, every photographing interval (for example, 1/30 seconds) of the photographing unit 140.

Figure 7:
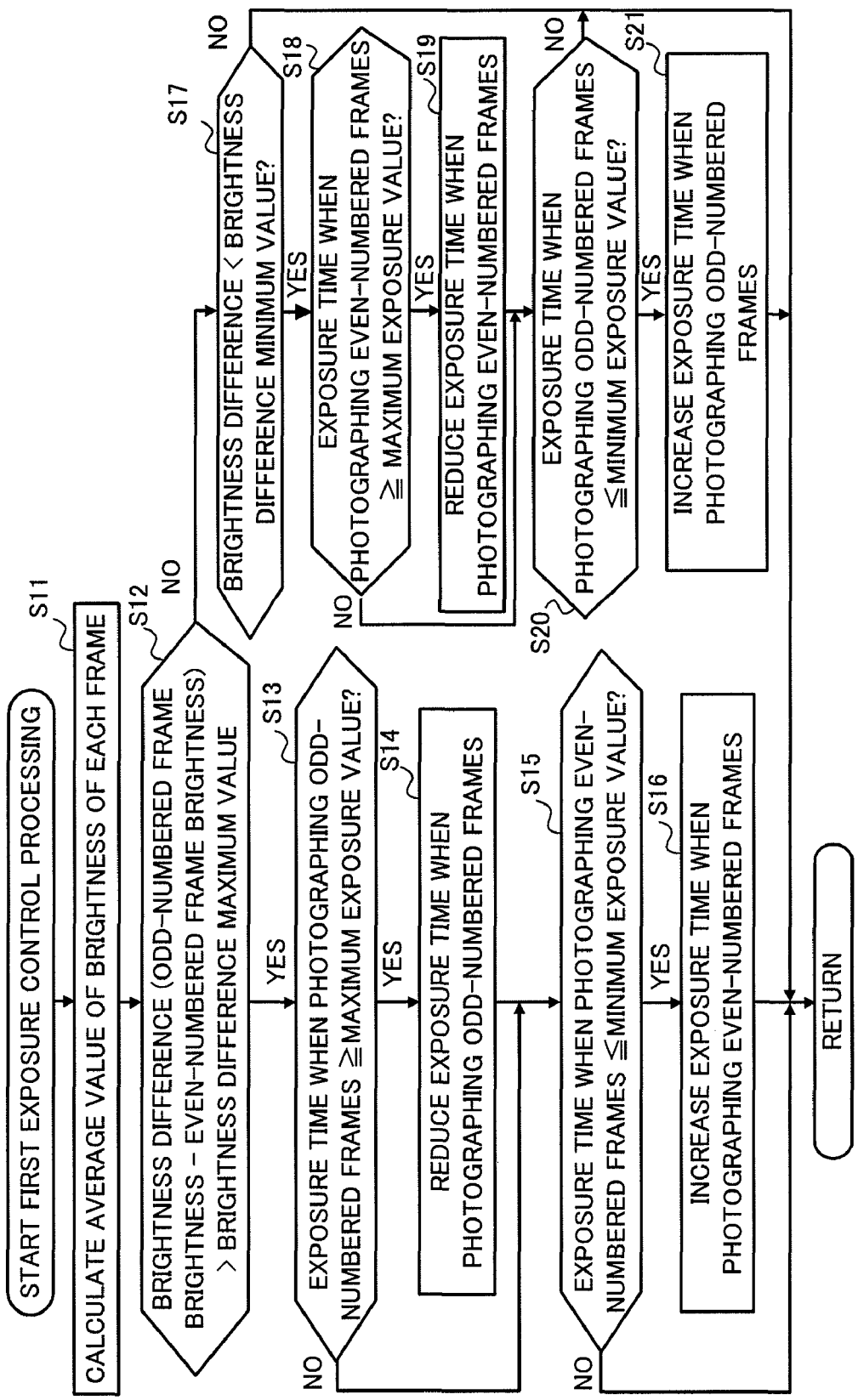
FIG. 7 is a flowchart of a first exposure control process by a camera of a second embodiment.

As shown in FIG. 7, the CPU 101 obtains average values for brightness of each frame (step S11). The CPU 101 then determines whether or not a "brightness difference" that is a value for the average value of the brightness of the even-numbered frames subtracted from the average value of the brightness of the odd-numbered frames is larger than the brightness difference maximum value BDmax (step S12).

If the brightness difference is larger than the brightness difference maximum value BDmax (step S12: YES), the CPU 101 determines whether or not the exposure time is greater than the maximum exposure value ETmax in order to determine whether or not the exposure time when photographing the odd-numbered frames is too long (step S13).

If the exposure time when photographing the odd-numbered frames is greater than the maximum exposure value ETmax (step S13: YES), then the odd-numbered frames are overexposed. The CPU 101 therefore reduces the exposure time by a prescribed time (step S14). Step S15 is then proceeded to. If the exposure time is shorter than the maximum exposure value ETmax (step S13: NO), the CPU 101 determines whether or not the exposure time is less than the minimum exposure value ETmin in order to determine whether or not the exposure time when photographing even-numbered frames is too short (step S15).

If the exposure time when photographing even-numbered frames is less than the minimum exposure value ETmin (step S15: YES), the even-numbered frames are underexposed. The CPU 101 therefore increases the exposure time by a prescribed time (step S16), and the processing ends. If the exposure time is larger than the minimum exposure value ETmin (step S15: NO), the CPU 101 ends the processing.

On the other hand, if the brightness difference is less than the brightness difference maximum value BDmax (step S12: NO), the CPU 101 determines whether or not the brightness difference is smaller than the brightness difference minimum value BDmin (step S17).

If the brightness difference is greater than the brightness difference minimum value BDmin (step S17: NO), the CPU 101 ends the processing. If the brightness difference is smaller than the brightness difference minimum value BDmin (step S17: YES), the CPU 101 determines whether or not the exposure time is greater than the maximum exposure value ETmax in order to determine whether or not the exposure time when photographing the even-numbered frames is too long (step S18).

If the exposure time when photographing the even-numbered frames is greater than the maximum exposure value ETmax (step S18: YES), then the even-numbered frames are overexposed. The CPU 101 therefore reduces the exposure time by a prescribed time (step S19) and the processing proceeds to step S20. If the exposure time is shorter than the maximum exposure value ETmax (step S18: NO), the CPU 101 determines whether or not the exposure time when photographing odd-numbered frames is less than the minimum exposure value ETmin (step S20).

If the exposure time when photographing odd-numbered frames is less than the minimum exposure value ETmin (step S20: YES), the odd-numbered frames are underexposed. The CPU 101 therefore increases the exposure time by a prescribed time (step S21), and the processing ends. If the exposure time is longer than the minimum exposure value ETmin (step S20: NO), the CPU 101 ends the processing.

The CPU 101 therefore controls the exposure time when photographing odd-numbered frames and the exposure time when photographing even-numbered frames respectively so that the difference in brightness between the odd-numbered frames and the even-numbered frames becomes a prescribed value or less by repeating the first exposure control processing. It is therefore possible to sufficiently reduce the influence of reflected light picked up in the facial image of the driver by having the signal processing unit 104 synthesize new facial images using each frame photographed in this manner.

Figure 8A:
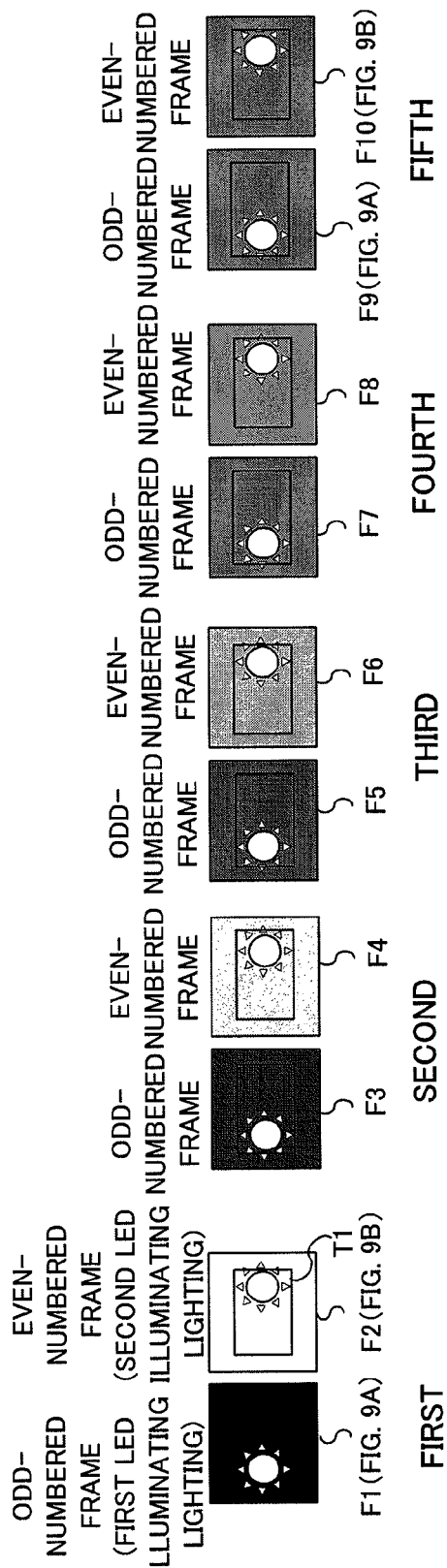
FIG. 8A is a diagram showing examples of odd-numbered frames and even-numbered frames photographed prior to the execution of processing when the first exposure control process is executed five times.

Next, an explanation is given of an example of brightness of the odd-numbered frames and the even-numbered frames photographed after the first exposure control processing. As shown in FIG. 8A, when the first exposure control processing (the processing of steps S11 to S21 in FIG. 7) is executed five times, the CPU 101 controls the exposure time when photographing each of the odd-numbered frames F3, F5, F7, F9 based on the brightness of each odd-numbered frame F1, F3, F5, F7 photographed immediately previously. Further, the CPU 101 controls the exposure time when photographing each even-numbered frame F4, F6, F8, F10 based on the brightness of each even-numbered frame F2, F4, F6, F8 photographed immediately previously. The brightness of each frame F1 to F10 is then obtained by calculating the average value of the brightness of each pixel within a detection frame T1 provided at each frame.

Figure 8B:
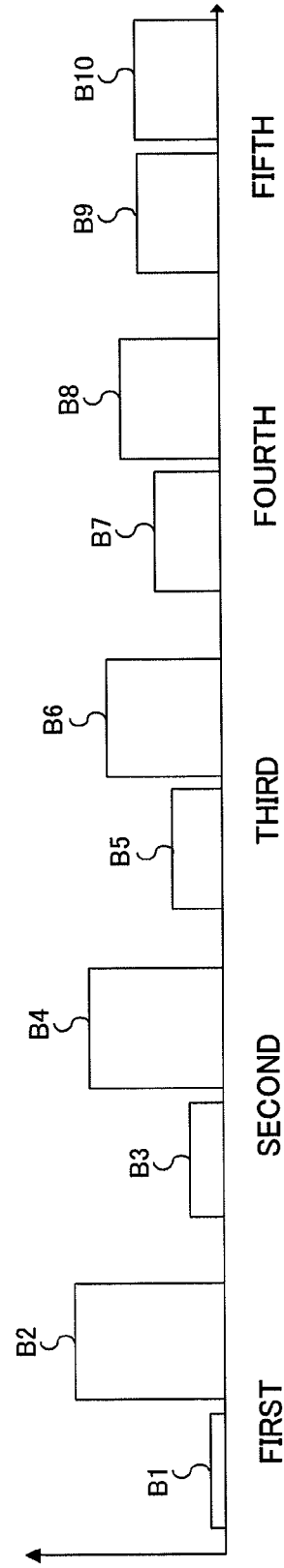
FIG. 8B is a diagram showing examples of average values for each brightness of the odd-numbered frames and the even-numbered frames photographed prior to the execution of processing when the first exposure control process is executed five times.

As shown in FIG. 8B, an average value B1 for the brightness of an odd-numbered frame F1 photographed before executing the first exposure control processing is substantially smaller than an average value B2 for an even-numbered frame F2. As a result, in the first round of the first exposure control processing, the brightness difference that is the average value B1 for the brightness of F1 with the average value B2 of the brightness of F2 subtracted is smaller than the brightness difference minimum value BDmin (step S17: YES). The CPU 101 therefore reduces the exposure time when photographing even-numbered frames in the processing of step S19 and increases the exposure time when photographing odd-numbered frames in the processing of step S21. The odd-numbered frame and the even-numbered frame photographed by the first round of the first exposure control processing are therefore the odd-numbered frame F3 and the even-numbered frame F4 as shown in FIG. 8A.

Nevertheless, the brightness difference between the frames F3 and F4 remains smaller than the brightness difference minimum value BDmin at the time of the brightness difference determination processing (processing of step S17) in the second round of the first exposure control processing. The CPU 101 therefore repeatedly executes the processing of steps S19 to S21 so as to change each exposure time to appropriate exposure times when photographing the odd-numbered frames and the even-numbered frames. As shown in FIG. 8B, the difference between an average value B9 for the brightness of an odd-numbered frame F9 and an average value B10 for the brightness of an even-numbered frame F10 substantially disappears in the brightness difference determination processing for the fifth round of the first exposure control processing.

Next, an explanation is given of an example of synthesizing a new facial image using odd-numbered frames and even-numbered frames photographed by the first exposure control processing.

The odd-numbered frame F1 shown in FIG. 9A and the even-numbered frame F2 shown in FIG. 9B are the same as each of the frames F1 and F2 photographed before execution of the first round of the first exposure control processing shown in FIG. 8A. Each of the frames F1 and F2 in FIGS. 9A and 9B are examples of images that pick up light reflected by the lenses of glasses etc. worn by the driver and R3 and R4 within each of the frames F1 and F2 show the picking up of reflected light by the respective lenses. In this example, the brightness difference between each of the frames F1 and F2 is substantial. As shown in FIG. 9C, a picked-up portion R5 of reflected light within the new facial image f1 is not reduced even in cases when synthesis processing is carried out by the signal processing unit 104 based on each of the frames F1 and F2.

The odd-numbered frame F9 of FIG. 9D and the even-numbered frame F10 of FIG. 9E are the same as each of the frames F9 and F10 photographed before execution of the fifth round of the first exposure control processing shown in FIG. 8A. Each of the frames F9 and F10 of FIG. 9D and FIG. 9E are examples of images that take in reflected light due to the lenses of glasses etc. worn by the driver, where R6 and R7 in the drawing are portions that pick up light reflected by the lenses. In this example, there is substantially no difference in brightness between F9 and F10 as a result of the first exposure control processing being executed repeatedly. The picking up of reflected light at the facial image can therefore be sufficiently reduced when the image synthesis processing of the signal processing unit 104 using each of the frames F9 and F10 is adopted as shown in FIG. 9F.

Third Embodiment

When the inside of the vehicle is bright so that the intensity of light incident to the vehicle-mounted camera 1 is strong, it is not possible to sufficiently reduce the extent to which the reflected light is picked up even when the image synthesis processing by the signal processing unit 104 or the first exposure control processing by the CPU 101 is executed. In order to avoid this problem, it is possible to reduce the extent to which light is picked up by the facial image by making the exposure time short (for example, approximately one third or less of a frame period). This kind of exposure control processing is referred to as "second exposure control processing" in the following.

The structure of the vehicle-mounted camera system of the third embodiment that is an example of carrying out the second exposure control processing is basically the same as the example shown in FIG. 1. However, a second exposure control program for second exposure control processing is also stored in the EEPROM 160 the vehicle-mounted camera 1 of the third embodiment is provided with.

Next, a detailed explanation is given of the "second exposure control processing" by the vehicle-mounted camera 1 having the above configuration. The CPU 101 reads out the second exposure control program from the EEPROM 160 and executes the second exposure control program, for example, every frame period (for example, 1/30 seconds) of the photographing unit 140.

Figure 10:
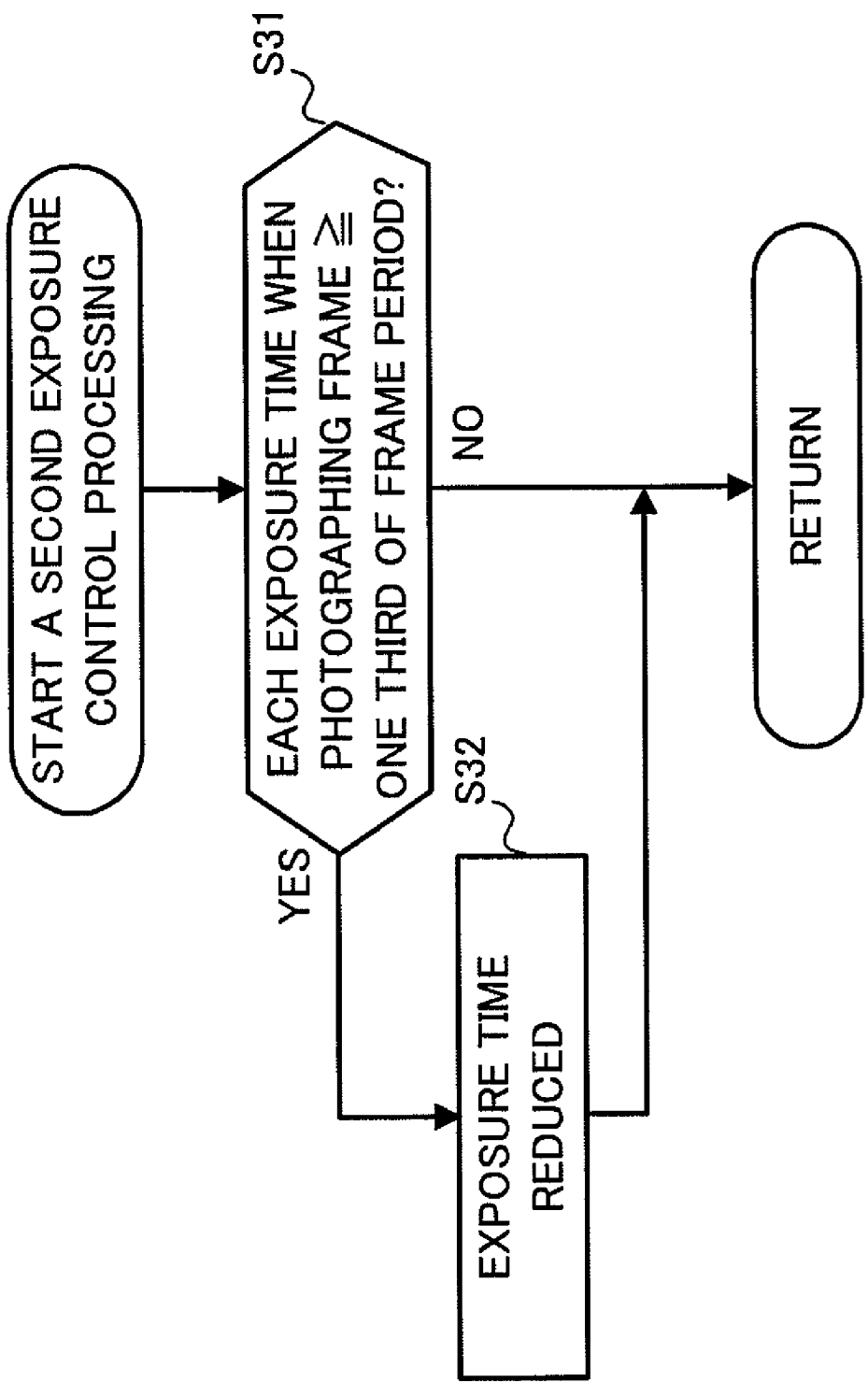
FIG. 10 is a flowchart of a second exposure control process by a camera of a third embodiment.

As shown in FIG. 10, the CPU 101 determines whether or not each exposure time when photographing odd-numbered frames or when photographing even-numbered frames is one third or more of the frame period (step S31). If each exposure time is one third or more of the frame period (step S31: YES), the CPU 101 shortens the exposure time by a prescribed duration (step S32) and ends processing. If the exposure time is less than one third of the frame period (step S31: NO), the CPU 101 ends the processing.

Figure 11A:
FIG. 11A is a diagram showing an example of a frame photographed when exposure time is set to one third or more of a frame period.

When the exposure time is set to be larger than one third of one frame period (for example, 1/30 seconds), the exposure time is too long. This means that it is therefore easy for light reflected by glasses etc. to be picked up by the facial image as shown in FIG. 11A. In this event, it is not possible to reduce the reflected light picked up by the facial image even if synthesis processing is implemented by the signal processing unit 104.

Figure 11B:
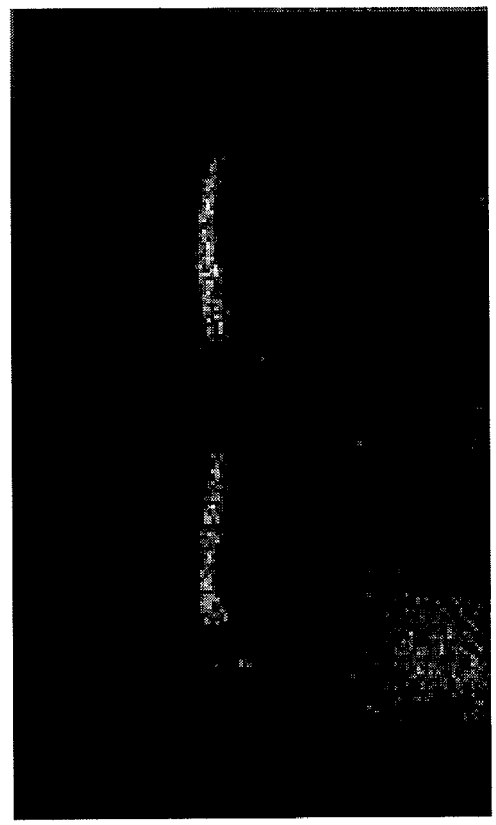
FIG. 11B is a diagram showing an example of a frame photographed when the exposure time is set to less than one third of the frame period.

On the other hand, when the exposure time at the time of photographing using the second exposure control processing is taken to be one third or less of one frame period, the influence of reflected light picked up by the facial image can be reduced as shown in FIG. 11B.

Fourth Embodiment

In the first to third embodiments described above, the vehicle-mounted camera 1 synthesizes new facial images where the extent to which reflected light is taken in is reduced and the ECU 2 then carries out various control using facial images after synthesis. The present invention is, however, by no means limited to these embodiments. For example, image synthesis processing etc. can be implemented by devices other than the vehicle-mounted camera 1.

In the fourth embodiment, an example is explained where the vehicle-mounted camera 1 photographs each frame showing the face of the driver at the time of alternate illumination by the two illuminating devices, the ECU 2 synthesizes each frame so as to create one facial image, and this facial image is then utilized.

Figure 12:
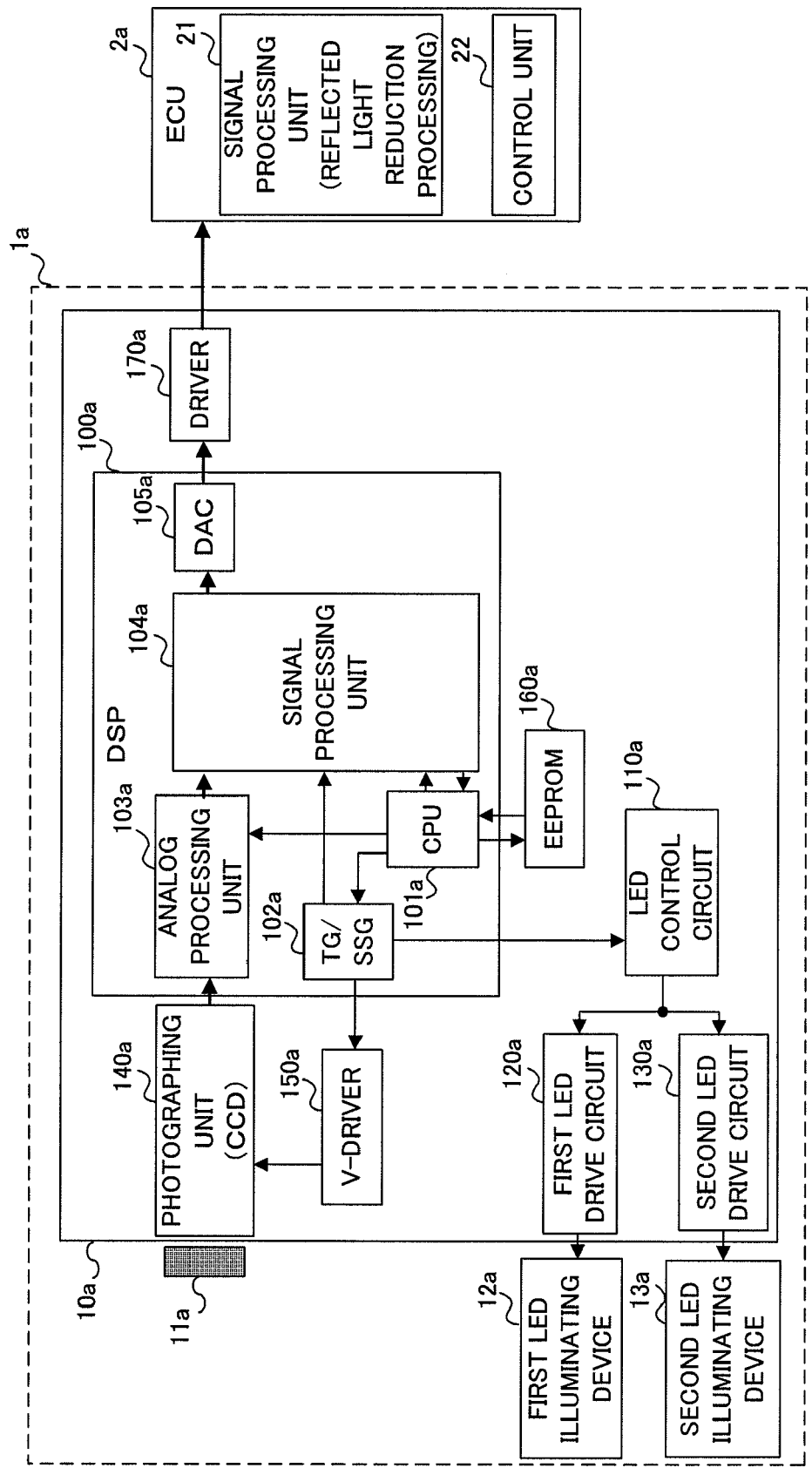
FIG. 12 is a diagram showing an overall configuration of a vehicle-mounted camera system and a circuit configuration of a camera constituting the vehicle-mounted camera system of a fourth embodiment of the present invention.

First, an explanation is given of a configuration of the vehicle-mounted camera system of the fourth embodiment. As shown in FIG. 12, the vehicle-mounted camera system of the fourth embodiment is basically the same as the example shown in FIG. 1 and includes a vehicle-mounted camera 1a and an ECU 2a.

The ECU 2a shown in FIG. 12 includes a signal processing unit 21 and the control unit 22. As with the signal processing unit 104 the vehicle-mounted camera 1 of FIG. 1 is provided with, the signal processing unit 21 extracts pixels of low brightness of the pixels of the odd-numbered frames and the even-numbered frames of which the relative positions are the same and generates a new image. The control unit 22 then executes substantially the same control operation as the ECU 2 of FIG. 1 based on the image synthesized by the signal processing unit 21.

The circuit configuration of the vehicle-mounted camera 1a shown in FIG. 12 is basically the same as the vehicle-mounted camera 1 shown in FIG. 1. However, unlike the signal processing unit 104 of FIG. 1, a signal processing unit 104a of FIG. 12 does not carry out the processing for synthesizing a new facial image. It is also possible to adopt a configuration where the signal processing unit 104a obtains an average brightness for each facial image and adjusts the exposure time based on this average brightness.

Next, a description is given of the operation of a vehicle-mounted camera system of a fourth embodiment having the above configuration. In the fourth embodiment, an image of the face illuminated by the first LED illuminating device 12 and an image of the face illuminated by the second LED illuminating device 13 are alternately provided from a driver 170a of the vehicle-mounted camera 1a to the ECU 2a every 1/30 seconds.

The signal processing unit 21 of an ECU 2a extracts pixels of low brightness of pixels of the same relative positions on the odd-numbered frame images and the even-numbered frame images, synthesizes a new facial image where the extent to which reflected light is picked up is reduced, and provides the new facial image to the control unit 22. The control unit 22, for example, specifies a region of this facial image that indicates the eyes. The control unit 22 then detects when the driver takes their eyes off the road or appears to fall asleep by determining the direction of the line of sight of the driver based on this region and carries out control according to detection results. It is therefore also possible to sufficiently reduce the influence of the reflected light picked up by the facial image with this configuration.

Processing executed by devices other than the vehicle-mounted camera 1 such as the ECU 2 in place of the vehicle-mounted camera 1 is not restricted to processing reducing the amount of reflected light picked up at the facial image. For example, the first exposure control processing of the second embodiment or processing synchronizing times of lighting of each of the illuminating devices 12 and 13 can also be carried out.

The frame period of the photographing unit 140 is not limited to 1/30 seconds and can be arbitrary (for example, 1/24 seconds, 1/15 seconds). The method the photographing unit 140 uses to transmit images is not limited to non-interlaced methods and can also be, for example, interlaced methods.

The units for comparing the brightness of the same relative positions of the odd-numbered frames and the even-numbered frames are not limited to one pixel units and can also be block units constituted by a plurality of pixels. In this event, for example, the average brightness occurring at each block is obtained. Blocks, of the blocks positioned in the same relative positions, for which the average brightness is small, can then be extracted. It is therefore possible to advance the processing speed when synthesizing new facial images.

The number of LED illuminating devices installed is not limited to 2, and can be three or more. In this event, the method for synthesizing the new facial image is not limited to synthesizing odd-numbered frames and even-numbered frames provided that the extent to which light reflected by lenses etc. is picked up can be sufficiently reduced.

This application is based on Japanese Patent Application No. 2006-304604 filed on Nov. 9, 2006, the entire disclosure of which is incorporated herein by reference in its entirety.

The invention claimed is:

1. A vehicle-mounted image processing device comprising:
    a plurality of illuminating units that illuminate a subject;
    a lighting unit that sequentially lights up the plurality of illuminating units at different times;
    a photographing unit that photographs respective images showing a subject illuminated by each illuminating unit lit up at each of the times by the lighting unit;
    a synthesizing unit that generates and outputs a new image showing the subject by extracting portions, of the lowest brightness, of the portions of each image positioned at the same relative positions on each image indicating the subject photographed by the photographing unit, and by synthesizing the extracted portions; and
    an exposure control unit that obtains average brightness for each image showing the subject taken by the photographing unit and controls exposure time of the photographing unit when photographing images so that an absolute value of a difference between each average brightness obtained becomes a prescribed value or less.

2. The vehicle-mounted image processing device according to claim 1, wherein two of the illuminating units are provided,
    the lighting unit alternately lights up each of the illuminating units,
    the photographing unit photographs respective images showing the subject at each time when each illuminating unit is lit by the lighting unit; and
    the synthesizing unit extracts portions of the lowest brightness from portions positioned at the same respective relative positions on each odd-numbered photographed subject image and each even-numbered photographed subject image taken by the photographing unit and generates a new image showing the subject by synthesizing the extracted portions.

3. The vehicle-mounted image processing device according to claim 1, wherein the synthesizing unit compares the brightness of pixels positioned at the same relative positions on each image showing the subject, extracts pixels of the lowest brightness, and synthesizes each extracted pixel.

4. The vehicle-mounted image processing device according to claim 1, wherein the synthesizing unit divides each image showing the subject taken by the photographing unit into a plurality of blocks, compares the brightness of each block positioned at the same relative position on each image, extracts blocks of the lowest brightness, and synthesizes the extracted blocks.

5. The vehicle-mounted image processing device according to claim 1, further comprising a control unit that carries out prescribed control based on an image of an eye included in a new image synthesized by the synthesizing unit.

6. A method for controlling a vehicle-mounted image processing device comprising:

a lighting step of sequentially lighting up a plurality of illuminating units at different times;

a photographing step of photographing respective images showing a subject illuminated by each illuminating unit lit up at each time in the lighting step; and a synthesizing step of generating and outputting a new image showing the subject by extracting portions, of the lowest brightness, of the portions of each image positioned at the same relative positions on each image showing the subject photographed in the photographing step, and by synthesizing the extracted portions; and an exposure control step of obtaining an average brightness for each image showing the subject taken by the photographing unit and controlling exposure time of the photographing unit when photographing images so that an absolute value of a difference between each average brightness obtained becomes a prescribed value or less.

\* \* \* \* \*